(12) United States Patent
Schiedegger et al.

(10) Patent No.: US 6,310,287 B1
(45) Date of Patent: Oct. 30, 2001

(54) ELECTRICAL BLOCK

(75) Inventors: Charles E. Schiedegger, Metamora; Aundrea Nurenberg, Brown City; Clyde D. Allen, North Branch; Michael C. Clark, Columbiaville; J. Richard Logan, Oxford, all of MI (US)

(73) Assignee: Tapco International Corporation, Plymouth, MI (US)

( * ) Notice: Subject to any disclaimer, the term of this patent is extended or adjusted under 35 U.S.C. 154(b) by 0 days.

(21) Appl. No.: 09/342,572

(22) Filed: Jun. 29, 1999

(51) Int. Cl.[7] ........................................ H01J 5/00
(52) U.S. Cl. .................. 174/50; 174/17 CT; 174/48; 174/50; 220/3.8; 220/3.9; 220/3.92; 439/535
(58) Field of Search ................. 174/48, 50, 58, 174/17 R, 63, 53, 66; 220/3.2, 3.3, 4.02, 241, 3.8; 439/535; 248/343, 906; D13/152; D8/350–353

(56) References Cited

U.S. PATENT DOCUMENTS

| | | |
|---|---|---|
| D. 343,825 | 2/1994 | Enderby . |
| D. 422,266 * | 4/2000 | Roesch ............................. D13/152 |
| 2,202,147 | 5/1940 | Gerriets . |
| 3,386,606 * | 6/1968 | Pastrick ............................. 220/3.94 |
| 3,906,145 | 9/1975 | Carmichael . |
| 4,229,916 | 10/1980 | White . |
| 4,327,841 | 5/1982 | Wimberly . |
| 4,726,152 | 2/1988 | Vagedes et al. . |
| 4,854,093 | 8/1989 | Kellom . |
| 4,874,904 * | 10/1989 | Desanti ............................. 174/53 |
| 4,875,318 | 10/1989 | MacLeod et al. . |
| 4,920,708 | 5/1990 | MacLeod et al. . |
| 5,000,409 | 3/1991 | MacLeod et al. . |
| 5,042,673 * | 8/1991 | McShane ............................. 220/3.7 |
| 5,117,996 * | 6/1992 | McShane ............................. 220/3.7 |
| 5,133,165 | 7/1992 | Wimberly . |
| 5,326,060 | 7/1994 | Chubb et al. . |
| 5,397,093 | 3/1995 | Chubb et al. . |
| 5,478,032 * | 12/1995 | Miller ............................. 248/27.1 |
| 5,522,577 * | 6/1996 | Roesch ............................. 248/343 |
| 5,578,791 | 11/1996 | Bosse, Jr. ............................. 174/48 |
| 5,598,670 | 2/1997 | Humphrey et al. . |
| 5,659,151 * | 8/1997 | Dale ............................. 174/48 |
| 5,668,350 * | 9/1997 | Yanase ............................. 174/50 |
| 5,722,208 | 3/1998 | Humphrey et al. . |
| 5,804,764 * | 9/1998 | Gretz ............................. 174/53 |
| 5,920,033 | 7/1999 | Bosse, Jr. ............................. 174/48 |
| 5,952,610 | 9/1999 | Bosse, Jr. ............................. 174/48 |
| 6,005,188 * | 12/1999 | Teichler et al. ............................. 174/50 |
| 6,041,956 * | 3/2000 | Kao ............................. 220/4.02 |

* cited by examiner

Primary Examiner—Dean A. Reichard
Assistant Examiner—Dhiru R Patel
(74) Attorney, Agent, or Firm—Howard & Howard

(57) ABSTRACT

An electrical block trim assembly that has a mount, a decorative ring, and a separate electrical box is provided. The mount has a base adapted to be secured to an exterior surface of a structure. The mount also has a housing extending from the base with a top portion that has an opening. Exterior covering, or siding, is attached to the exterior surface to surround a portion of the mount. A decorative ring is secured to the mount over the siding to conceal the edges of the siding that are adjacent to the mount. The decorative ring has an inner perimeter that is adjacent to the housing. An electrical box having walls with an upper portion is securely received and retained within the opening. The electrical box is interposed between the exterior surface and the top portion. The electrical box may be constructed of a different material than the mount and decorative ring.

17 Claims, 3 Drawing Sheets

ELECTRICAL BLOCK

BACKGROUND OF THE INVENTION

1. Technical Field

This invention relates to a multi-piece electrical block trim assembly for use on an exterior surface of a structure. The assembly supports an electrical outlet or other electrical fixture, and is adapted to be used with siding or other exterior surface covering.

2. Discussion

Electrical blocks have been developed for use on the exterior surfaces of a structure. The electrical blocks provide a decorative means of attaching an electrical fixture or outlet to structures having an uneven surface, such as a surface to which vinyl or aluminum siding has been attached. The electrical blocks typically have a mount that is attached directly to the structure. Siding or some other decorative covering is attached to the structure around the mount. A decorative ring, which may either be integral with the mount or a separate piece, covers the edges of the siding that are adjacent to the mount, thus providing a more pleasing appearance. In the prior art, the electrical box either has been integrally formed with the mount, or the electrical box has been at least partially recessed into the surface of the structure. Both of these electrical block configurations have posed problems.

Electrical block assemblies which are at least partially recessed into the surface of the structure are inconvenient because the hole in the structure that receives the electrical box must be placed in a position in which it does not interfere with the supporting structure underlying the surface. Designs having electrical boxes that are integrally formed with the mount typically cannot be molded with a plastic material that has good weatherability and color characteristics while still providing a design that meets suggested safety requirements, such as those provided by Underwriters Laboratories.

Accordingly, it is an object of the present invention to provide a multi-piece electrical block that has good weatherability and color characteristics and has an electrical box that is capable of meeting suggested safety standards.

SUMMARY OF THE INVENTION

An electrical block trim assembly that has a mount, a decorative ring, and a separate electrical box provides the above and other objects of the invention. The mount has a base adapted to be secured to an exterior surface of a structure. The mount also has a housing extending from the base with a top portion that has an opening. Exterior covering, or siding, is attached to the exterior surface to surround a portion of the mount. A decorative ring is secured to the mount over the siding to conceal the edges of the siding that are adjacent to the mount. The decorative ring has an inner perimeter that is adjacent to the housing. An electrical box having walls with an upper portion is securely received and retained within the opening. The electrical box is interposed between the exterior surface and the top portion. The electrical box may be constructed of a different material than the mount and decorative ring.

DESCRIPTION OF THE DRAWINGS

The various advantages of the present invention will become apparent to one skilled in the art by reading the following specification and subjoined claims and by referencing the following drawings in which:

DETAILED DESCRIPTION OF THE PREFERRED EMBODIMENTS

Figure 1A:
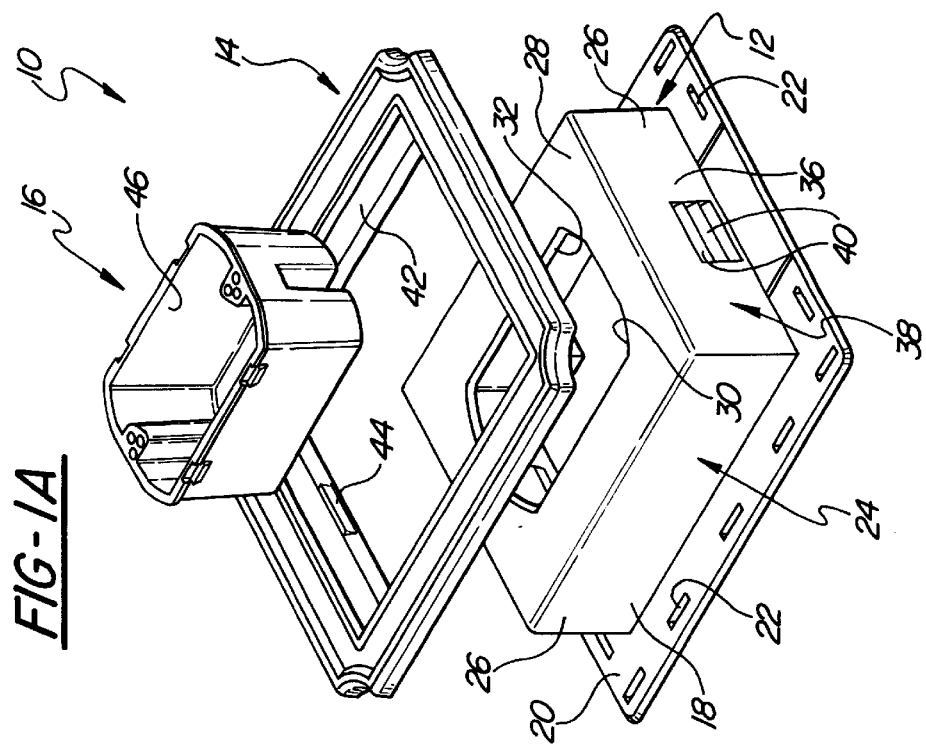
FIG. 1A is an exploded perspective view of the electrical block of the present invention.
Figure 1B:
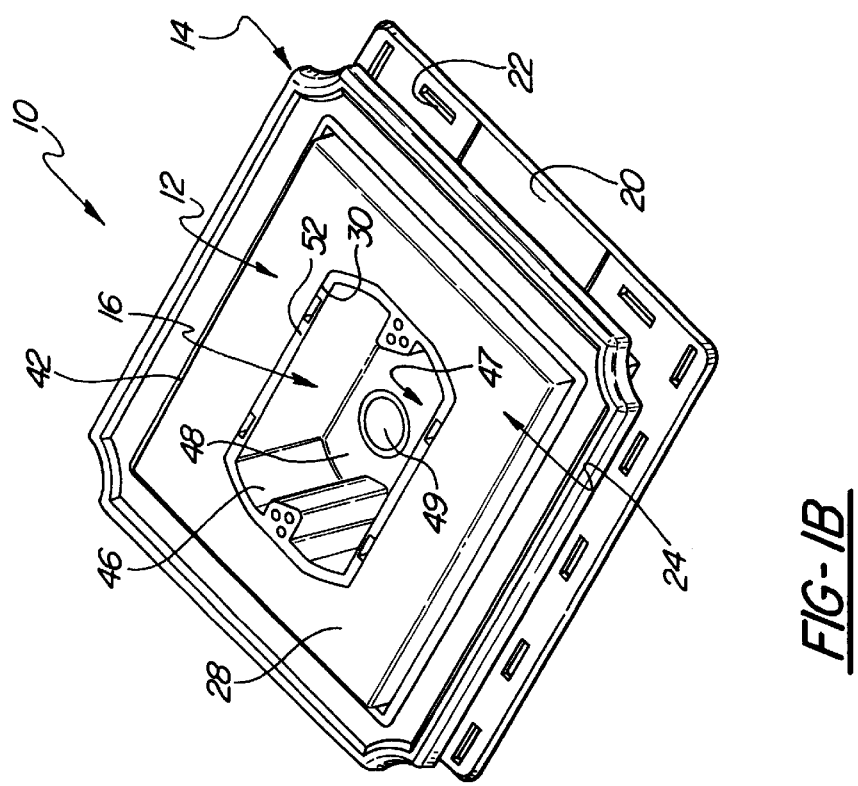
FIG. 1B is a perspective view of the present invention assembled.

Referring to FIGS. 1A and 1B, an electrical block trim assembly 10 for use on an exterior surface of a structure is shown. The assembly 10 has three main components: a mount 12, a decorative ring 14, and an electrical box 16. The mount 12 has a base 18, or lower portion, from which a flange 20 extends. The flange 20 has a plurality of holes 22 adapted to accommodate fasteners which are used to attach the mount 12 to the exterior surface. A rectangular housing 24 is defined by a plurality of side walls 26 that extend from the base 18. Although using a rectangular shaped housing simplifies installation of siding around the assembly, it is to be understood that the housing 24 can be any desired shape.

Figure 2:
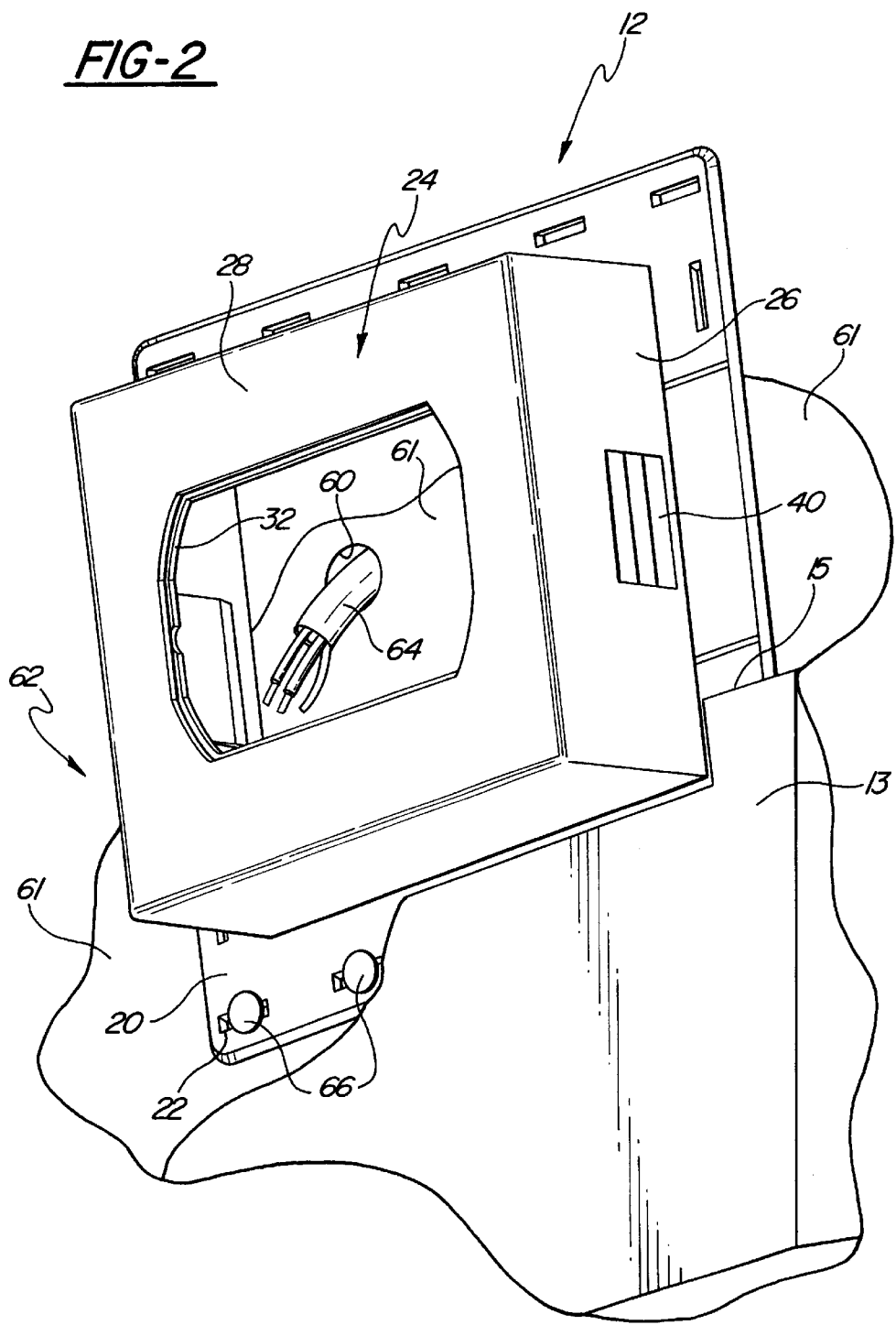
FIG. 2 is a partial perspective view of a mount of the present invention attached to an exterior surface to which siding is attached.

The housing 24 has a top portion 28 disposed between the side walls 26 opposite from the base 18. The top portion 28 has an opening 30 and a ledge 32 formed about the opening 30, which is best shown in FIG. 2. The ledge 32 forms a first interlocking member that is used to secure and retain the electrical box 16 to the mount 12, as described in detail below. With continuing reference to FIGS. 1A and 1B, the housing 24 has an outer surface 36 with opposing portions 38 located on opposite side walls 26, only one of which can be seen in the Figures. Each of the portions 38 has grooves 40 that are adjacent to one another and that run parallel to the base 18.

The decorative ring 14 is secured to the mount 12 over the siding 13 to conceal the edges 15, as best shown in FIG. 2. With continuing reference to FIGS. 1A and 1B, the decorative ring 14 has an rectangular inner perimeter 42 that corresponds to the contour of the housing 24. The inner perimeter 42 has opposing protrusions 44, only one of which can be seen in the Figures, that are aligned with the grooves 40 so that the protrusions 44 interlock with the grooves 40 when the decorative ring 14 is installed over the mount 12. By providing multiple adjacent grooves 40, the decorative ring 14 may be installed closely to sidings 13 of varying thickness.

The electrical box 16 is secured to the mount 12 during installation of the assembly 10. The electrical box 16 has walls 46 with a bottom portion 48 disposed between lower portions of the walls 46, which form a cavity 47 to accommodate wires and other electrical components. At least one knock-out 49 is provided on the bottom portion 48 so that the knock-out 49 may be removed and wires may be passed through the resulting opening and into the electrical box cavity 47.

Figure 3:
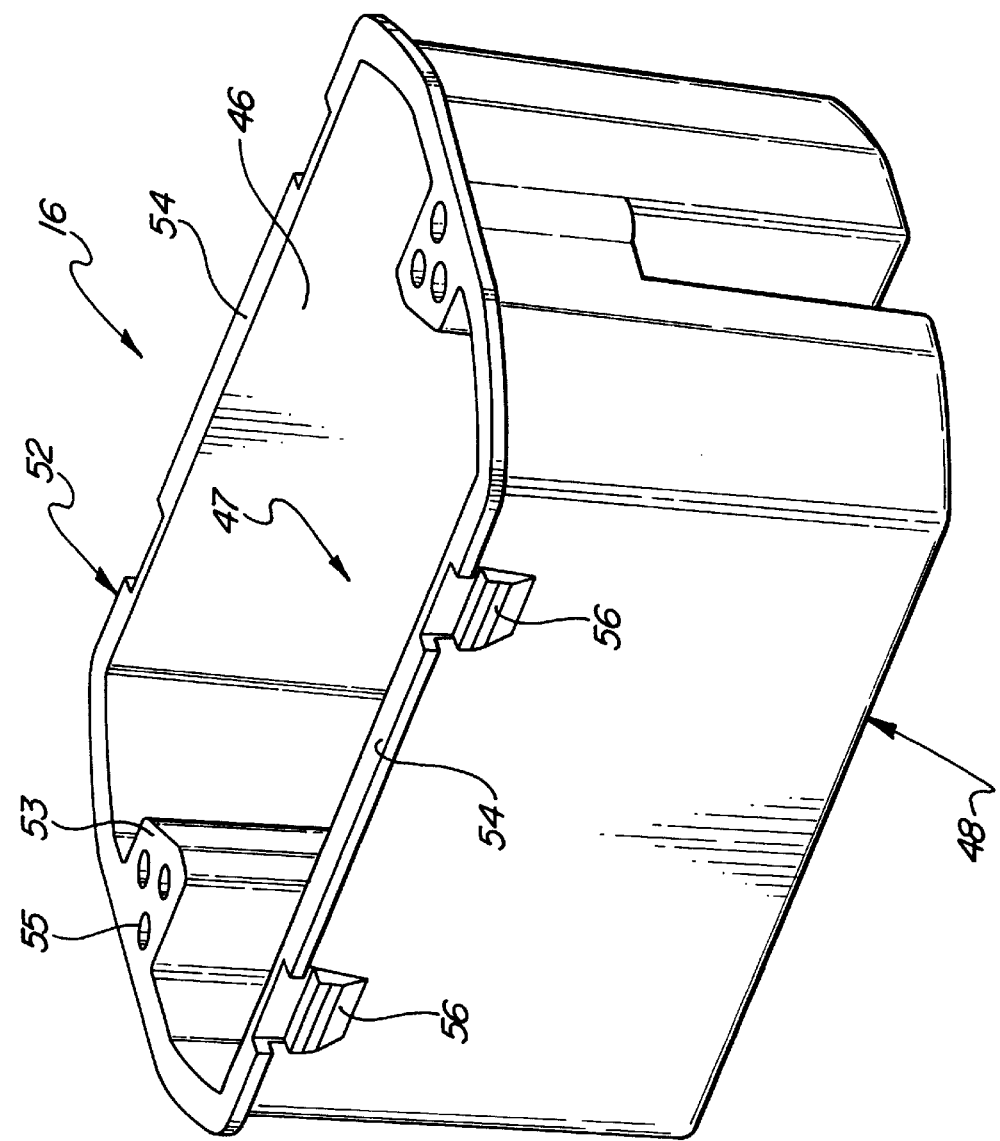
FIG. 3 is an enlarged perspective view of an electrical box of the present invention.

The electrical box 16 has a second interlocking member that coacts with said first interlocking member and secures said electrical box to the mount 12. As best shown in FIG. 3, the walls 46 have an upper portion 52 with a lip 54 that is securely received and retained within the opening 30 and supported by the ledge 32. The upper portion 52 has attachment portions 53 with holes 55 to which electrical fixtures may be fastened.

The upper portion 52 has at least one tab 56 that is proximate to the lip 54. The ledge 32 forms the first interlocking member and the lip 54 and at least one tab 56 form the second interlocking member. The tabs 56 secure the electrical box 16 to the mount 12 by receiving the ledge 32 between the lip 54 and the tabs 56. In this manner, the electrical box 16 is snapped into the opening 30 in the mount 12. However, it is to be understood that the electrical box 16 may be retained in the opening 30 using any suitable mechanism. For example, a different interlocking configuration may be used, or an interference fit between the electrical box 16 and opening 30 may be used.

The present invention provides an improved method of installation. Returning now to FIG. 2, a hole 60 is made in a surface 61 of a structure 62 through which electrical wires 64 are fed. The mount 12 is secured to the surface 61 by a plurality of fasteners 66 disposed within holes 22. Exterior covering, or siding 13, is installed on the surface 61 surrounding a portion of the mount 12. The decorative ring 14 (not shown) is installed over the siding 13 and secured to the mount 12 by protrusions 44 and groves 40. The electrical box 16 is snapped into the opening 30 so that it is positioned between the exterior surface 61 and the top portion 28. First and second interlocking members secure the electrical box 16 to the mount 12. The wires 64 are received in the cavity 47 through a removed knock-out 49.

Since the mount 12 and the electrical box 16 are separate components of the assembly 10, they may be constructed from different plastic materials. This enables plastic materials having different characteristics to be used. For example, a plastic suitable for electrical boxes may be used when constructing the electrical box, and a plastic suitable for molding in a wide variety of colors and which has good weatherability may be used for the mount 12 and decorative ring 14. It is also contemplated by Applicants that the mount 12 and electrical box 16 be provided as a preassembled unit, securely snapped together.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, specification and following claims.

What is claimed is:

1. An electrical block trim assembly for use on an exterior surface of a structure comprising:

a mount having a base adapted to be secured to an exterior surface and a housing extending from said base, said housing having top portion with an opening;

exterior covering surrounding a portion of said mount;

a decorative ring secured to said mount over siding, said decorative ring having an inner perimeter adjacent to said housing; and an electrical box having walls with an upper portion that is securely received and retained within said opening, said electrical box interposed between the exterior surface and said top portion.

2. The assembly as set forth in claim 1 wherein said base has a flange extending therefrom, said flange having a plurality of holes adapted to accommodate fasteners to attach said mount to the exterior surface.

3. The assembly as set forth in claim 1 wherein said housing has an outer surface with opposing portions, one of said opposing portions and said inner perimeter of said ring having grooves and the other of said opposing portions and said inner perimeter of said ring having opposing protrusions that are aligned with said grooves wherein said protrusions interlocks with said grooves.

4. The assembly as set forth in claim 3 wherein said opposing portions have opposing grooves and inner perimeter has said opposing protrusions.

5. The assembly as set forth in claim 1 wherein said inner perimeter has a rectangular shape and said housing has a complementary rectangular shape.

6. The assembly as set forth in claim 1 wherein said mount has a first interlocking member and said electrical box has a second interlocking member that coacts with said first interlocking member and secures said electrical box to said mount.

7. The assembly as set forth in claim 6 wherein said top portion of the mount has a ledge about said opening, and said upper portion of said electrical box has a lip that abuts said ledge.

8. The assembly as set forth in claim 7 wherein said upper portion has at least one tab proximate to said lip, said ledge forming said first interlocking member and said lip and said at least one tab forming said second interlocking member, said at least one tab secures said electrical box to said mount by receiving said ledge between said lip and said at least one tab.

9. The assembly as set forth in claim 1 wherein said mount is constructed from a first plastic material and said electrical box is constructed from a second plastic material that is different from said first plastic material.

10. The assembly as set forth in claim 1 wherein said exterior covering is siding.

11. A multi-piece electrical block device for attaching to a surface of a structure comprising:

a mount having a base adapted to abut a surface and a housing extending from said base, said housing having an opening; and an electrical box having walls with an upper portion, said opening sized to receive and adapted to securely retain said upper portion; and a ring having an inner perimeter sized to receive said housing.

12. A multi-piece electrical block device for attaching to a surface of a structure comprising:

a mount having a base adapted to abut a surface and a housing extending from said base, said housing having an opening; and an electrical box having walls with an upper portion, said opening sized to receive and adapted to securely retain said upper portion; and a ring having an inner perimeter sized to receive said housing;

wherein said housing has an exterior surface with opposing portions, one of said opposing portions in said inner perimeter of said ring having opposing grooves and the other of said opposing portions and said inner perimeter having opposing protrusions that are aligned with said opposing grooves wherein said protrusions are adapted to interlock with said grooves when said ring receives said housing.

13. A multi-piece electrical block device for attaching to a surface of a structure comprising:

a mount having a base adapted to abut a surface and a housing extending from said base, said housing having an opening; and an electrical box having walls with an upper portion, said opening sized to receive and adapted to securely retain said upper portion; and a ring having an inner perimeter sized to receive said housing;

wherein said housing has an exterior surface with opposing portions, having opposing grooves and said inner perimeter of said ring having opposing protrusions that are aligned with said opposing grooves wherein said protrusions are adapted to interlock with said grooves when said ring receives said housing.

14. A multi-piece electrical block device for attaching to a surface of a structure comprising:

a mount having a base adapted to abut a surface and a housing extending from said base, said housing having an opening; and an electrical box having walls with an upper portion, said opening sized to receive and adapted to securely retain said upper portion;

wherein said mount has a first interlocking member and said electrical box has a second interlocking member adapted to co-act with said first interlocking member and secure said electrical box to said mount when said mount receives said electrical box.

15. A multi-piece electrical box device for attaching to a surface of a structure comprising:

a mount having a base adapted to abut a surface and a housing extending from said base, said housing having an opening, wherein said housing has a top portion with said opening in said top portion, said top portion having a ledge about said opening; and an electrical box having walls with an upper portion, said opening sized to receive and adapted to securely retain said upper portion, said upper portion having a lip adapted to abut said ledge when said opening receives said electrical box;

wherein said mount has a first interlocking member and said electrical box has a second interlocking member adapted to co-act with said first interlocking member and secure said electrical box to said mount when said mount receives said electrical box.

16. A multi-piece electrical block device for attaching to a surface of a structure comprising:

a mount having a base adapted to abut a surface and a housing extending from said base, said housing having an opening, wherein said housing has a top portion with said opening in said top portion, said top portion having a ledge about said opening; and an electrical box having walls with an upper portion, said opening sized to receive and adapted to securely retain said upper portion, said upper portion having a lip adapted to abut said ledge when said opening receives said electrical box;

wherein said upper portion has at least one tab proximate to said lip, said ledge forming said first interlocking member and said lip and said at least one tab forming said second interlocking member, said at least one tab being adapted to secure said electrical box to said mount by receiving said ledge between said lip and said at least one tab.

17. The multi-piece electrical box device for attaching to a surface of a structure of claim 11 wherein said mount is constructed of a first plastic material and said electrical box is constructed of a second plastic material.

* * * * *